United States Patent
Garcia

(10) Patent No.: US 11,100,701 B2
(45) Date of Patent: Aug. 24, 2021

(54) METHOD AND APPARATUS FOR IMPLEMENTING A GLOW CHARACTERISTIC ON GRAPHICS OBJECTS WITHIN MULTIPLE GRAPHICS LIBRARY ENVIRONMENTS

(71) Applicant: IMVU, Inc., Redwood City, CA (US)

(72) Inventor: Llorenç Marti Garcia, Mountain View, CA (US)

(73) Assignee: IMVU, Inc., Redwood City, CA (US)

( * ) Notice: Subject to any disclaimer, the term of this patent is extended or adjusted under 35 U.S.C. 154(b) by 0 days.

(21) Appl. No.: 16/717,673

(22) Filed: Dec. 17, 2019

(65) Prior Publication Data

US 2021/0183140 A1 Jun. 17, 2021

(51) Int. Cl.
| | |
|---|---|
| *G06T 15/50* | (2011.01) |
| *G06T 15/00* | (2011.01) |
| *G06T 1/60* | (2006.01) |
| *G06T 5/00* | (2006.01) |
| *G06T 11/20* | (2006.01) |

(52) U.S. Cl.
CPC .............. *G06T 15/50* (2013.01); *G06T 1/60* (2013.01); *G06T 5/002* (2013.01); *G06T 11/20* (2013.01); *G06T 15/005* (2013.01)

(58) Field of Classification Search
CPC ....... G06T 15/50; G06T 5/002; G06T 15/005; G06T 1/60; G06T 11/20
See application file for complete search history.

(56) References Cited

U.S. PATENT DOCUMENTS

| | | | |
|---|---|---|---|
| 7,202,867 B1* | 4/2007 | Rodriguez | G06T 15/50 345/426 |
| 10,022,632 B1* | 7/2018 | McAdoo | G06Q 30/06 |
| 2002/0082081 A1* | 6/2002 | Takeuchi | H04N 13/122 463/32 |
| 2008/0139301 A1* | 6/2008 | Holthe | A63F 13/335 463/25 |
| 2008/0307341 A1* | 12/2008 | Ferry | G06F 3/04817 715/764 |
| 2013/0117684 A1* | 5/2013 | Ingole | G06F 3/04817 715/744 |

* cited by examiner

*Primary Examiner* — Sing-Wai Wu
(74) *Attorney, Agent, or Firm* — DLA Piper LLC (US)

(57) ABSTRACT

A method and apparatus are disclosed for implementing a glow characteristic on part or all of a graphics object within a plurality of different graphics library environments. The glow characteristic is implemented by a client application utilizing a graphics library and drawing to no more than one frame buffer at a time. The same glow characteristic can be rendered on client devices utilizing different graphics libraries.

16 Claims, 17 Drawing Sheets

Object 310
(In Frame Buffer 311)

Object 320
(In Frame Buffer 321)

Object 330
(In Frame Buffer 331)

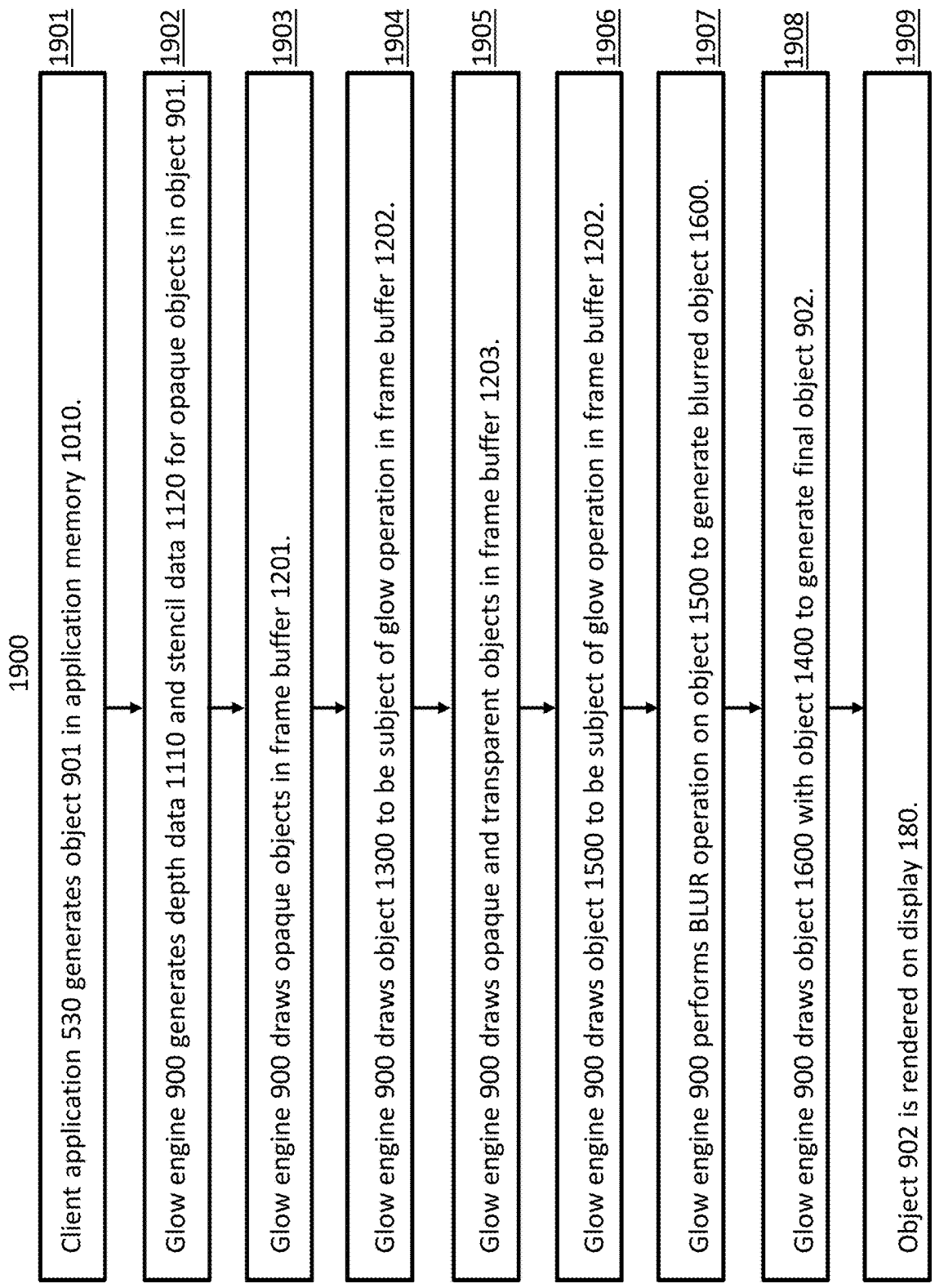

METHOD AND APPARATUS FOR IMPLEMENTING A GLOW CHARACTERISTIC ON GRAPHICS OBJECTS WITHIN MULTIPLE GRAPHICS LIBRARY ENVIRONMENTS

TECHNICAL FIELD

A method and apparatus are disclosed for implementing a glow characteristic on part or all of a graphics object within any of a plurality of different graphics library environments.

BACKGROUND OF THE INVENTION

Graphics technology is continually evolving. Typically, a computing device executes software using a central processing unit (CPU) or a graphics processing unit (GPU) to generate graphics on a display of the computing device. The software often utilizes functionality made available to the software by a graphics library. A graphics library is a program library designed to aid in rendering computer graphics to a display and typically provides functions for a variety of rendering tasks.

Graphics libraries themselves are continually evolving. For instance, there are dozens of versions of the open source graphics library OpenGL in use today. The functionality contained in OpenGL varies from version to version. For example, the version known as OpenGL ES 3.0 introduced the ability to make part or all of an object glow.

An example of a prior art system implementing a glow feature using OpenGL ES 3.0 will now be described.

FIG. 1 depicts hardware components of client device 100, which is a computing device such as a smartphone, notebook computer, tablet, desktop computer, gaming unit, wearable computing device such as a watch or glasses, or any other computing device. These hardware components are known in the prior art. Client device 100 is a computing device that comprises processing unit 110, memory 120, non-volatile storage 130, positioning unit 140, network interface 150, image capture unit 160, graphics processing unit 170, and display 180.

Processing unit 110 optionally comprises a microprocessor with one or more processing cores. Memory 120 optionally comprises DRAM or SRAM volatile memory. Non-volatile storage 130 optionally comprises a hard disk drive or flash memory array. Positioning unit 140 optionally comprises a GPS unit or GNSS unit that communicates with GPS or GNSS satellites to determine latitude and longitude coordinates for client device 100, usually output as latitude data and longitude data. Network interface 150 optionally comprises a wired interface (e.g., Ethernet interface) or wireless interface (e.g., 3G, 4G, 5G, GSM, 802.11, protocol known by the trademark BLUETOOTH, etc.). Image capture unit 160 optionally comprises one or more standard cameras (as is currently found on most smartphones and notebook computers). Graphics processing unit 170 optionally comprises a controller or processor for generating graphics for display. Display 180 displays the graphics generated by graphics processing unit 170, and optionally comprises a monitor, touchscreen, or other type of display.

FIG. 2 depicts software components of client device 100. Client device 100 comprises operating system 210 (such as the operating systems known by the trademarks WINDOWS, LINUX, ANDROID, IOS, or other operating system), graphics library 220 (such as OpenGL ES 3.0), and prior art client application 230. Prior art client application 230 comprises lines of software code executed by processing unit 110 and/or graphics processing unit. Prior art client application 230 utilizes graphics library 220, which here is OpenGL ES 3.0.

FIGS. 3A, 3B, 3C, 3D, and 4 depict an example of the steps taken by prior art client application 230 utilizing OpenGL ES 3.0 to make part of an object glow.

FIG. 3A depicts object 300, which comprises object 301, object 302, and object 303. Objects 301, 302, and 303 can be considered to be sub-objects of object 300. Object 300 is stored in application memory 305, which is a portion of memory 120 managed by prior art client application 230. Object 300 has not yet been drawn into a frame buffer or rendered on display 180. A frame buffer is a portion of memory 120 (or other memory in client device 100) containing pixels to be rendered on display 180. Notably, in OpenGL ES 3.0, up to four frame buffers can be drawn to concurrently to contain elements for the same state that is to be rendered in an upcoming frame. In this example, prior art client application 230 wishes to make objects 301 and 303 glow but not object 302. Here, objects 301 and 302 are opaque, and object 303 is transparent. Thus, part of object 302 (shown in a dotted line segment) is slightly, but not completely, obfuscated by object 303.

In FIG. 3B, prior art client application 230, utilizing the OpenGL ES 3.0 library, then draws objects 301 and 303 into frame buffer 311 as object 310. Optionally, object 310 can be drawn in a different color than objects 301 and 303 in FIG. 3A. Object 310 is the portion of object 300 that prior art client application 230 wishes to glow.

In FIG. 3C, prior art client application 230, utilizing the OpenGL ES 3.0 library, performs a BLUR function on object 310 and draws the resulting blurred object 320 into frame buffer 321, which is a different frame buffer than frame buffer 311.

In FIG. 3D, prior art client application 330, utilizing the OpenGL ES 3.0 library, then adds object 300 and blurred object 320 together and draws the resulting object, object 330, in frame buffer 331, which is a different frame buffer than frame buffers 311 and 321. Thus, it can be seen that object 330 contains a blurred version of object 300, where objects 301 and 303 have been blurred but object 302 has not been blurred.

In FIG. 4, object 330 is rendered on display 180 of client device 100 as object 400.

This glow feature of OpenGL ES 3.0 is a useful feature for software developers and users, and it enhances the graphics that can be generated by computing devices that support OpenGL ES 3.0. However, many computing devices use a graphics library other than OpenGL ES 3.0 and do not support the functions described above with reference to FIGS. 3A, 3B, 3C, 3D, and 4. Specifically, older versions of OpenGL allow for drawing to only one frame buffer at a time. This means that the sequence depicted in FIGS. 3A, 3B, 3C, 3D, and 4 cannot be performed in such versions. This is problematic, because users of such computing devices will be unable to view images that were intended to be rendered with a glow if prior art client application 230 was developed based on the assumption that it would be executed by a computing device that utilizes OpenGL ES 3.0 or a version with similar features.

What is needed is an apparatus and method that enable computing devices to add a glow to part or all of a graphics object regardless of which graphics library the computing device is utilizing.

SUMMARY OF THE INVENTION

A method and apparatus are disclosed for implementing a glow characteristic on part or all of a graphics object within a plurality of different graphics library environments. The glow characteristic is implemented by a client application utilizing a graphics library and drawing to no more than one frame buffer at a time. The same glow characteristic can be rendered on client devices utilizing different graphics libraries.

BRIEF DESCRIPTION OF THE DRAWINGS

FIG. 19 depicts a method of adding a glow feature to all or part of an object and rendering the resulting object on a display of a computing device.

DETAILED DESCRIPTIONS OF THE PREFERRED EMBODIMENTS

Figure 1:
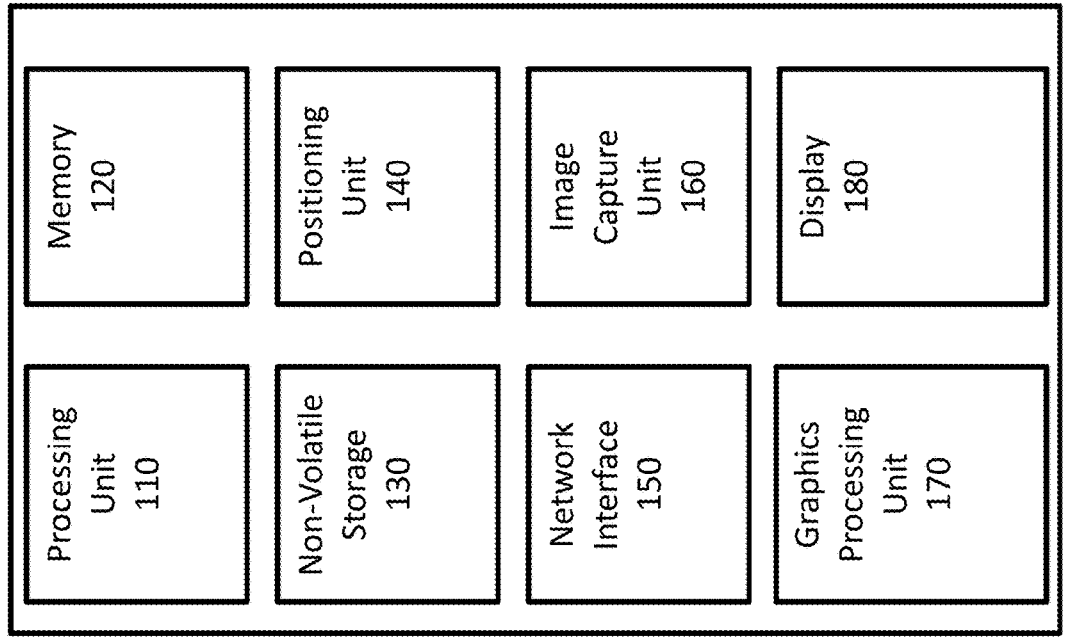
FIG. 1 depicts hardware components of a prior art client device.
Figure 2:
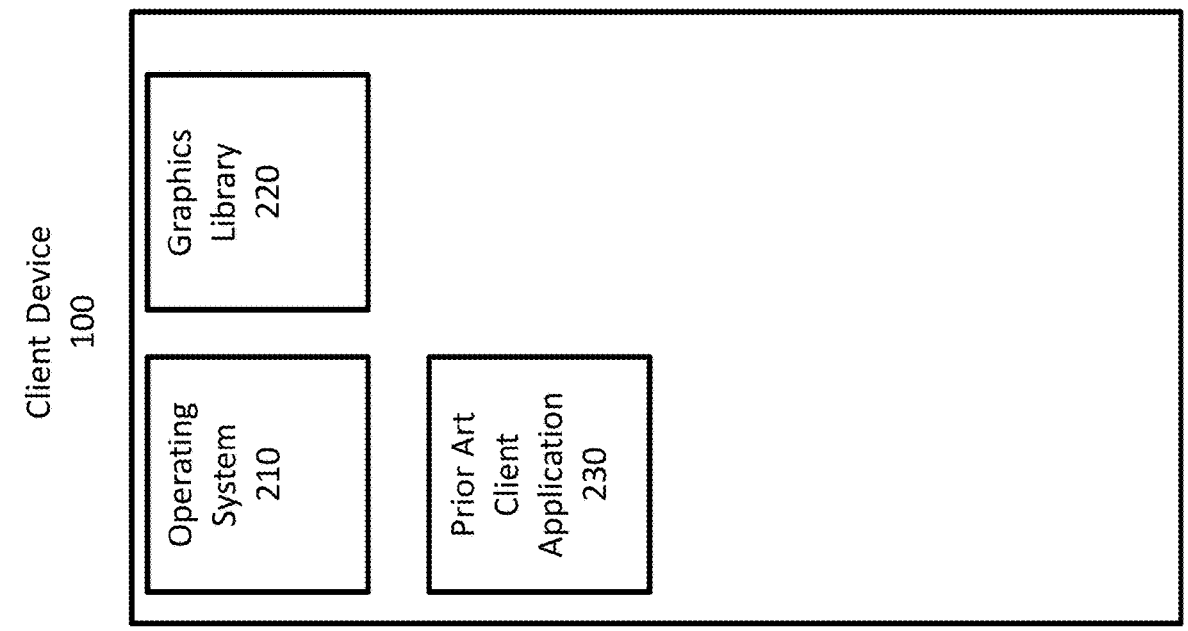
FIG. 2 depicts software components of the prior art client device.
Figure 3A:
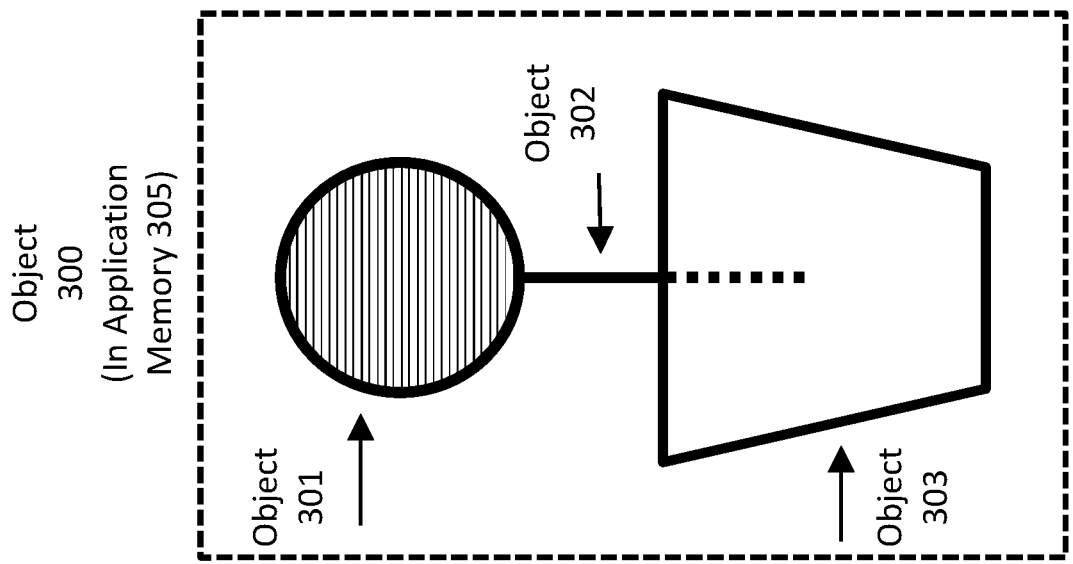
FIG. 3A depicts a graphics image in application memory in the prior art client device.
Figure 3B:
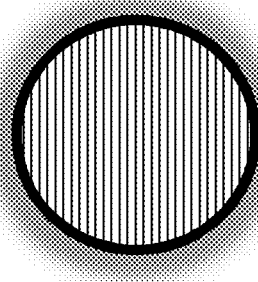
FIG. 3B depicts an object drawn into a first frame buffer in the prior art client device.
Figure 3B:
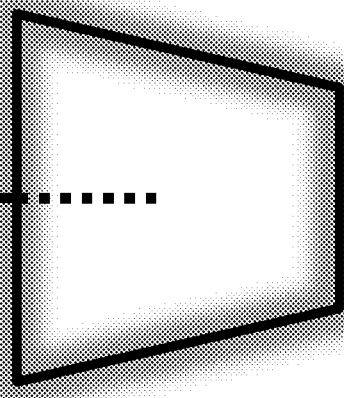
Figure 3C:
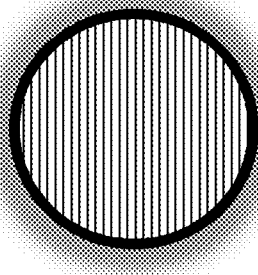
FIG. 3C depicts an object drawn into a second frame buffer in the prior art client device.
Figure 3C:
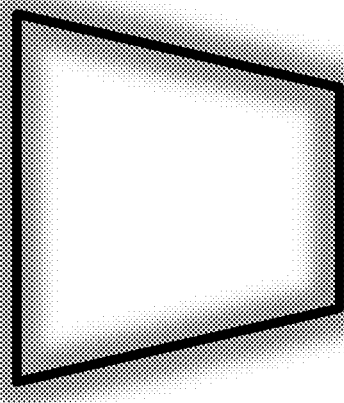
Figure 3D:
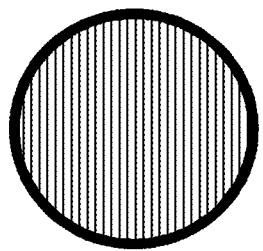
FIG. 3D depicts an object drawn into a third frame buffer in the prior art client device.
Figure 3D:
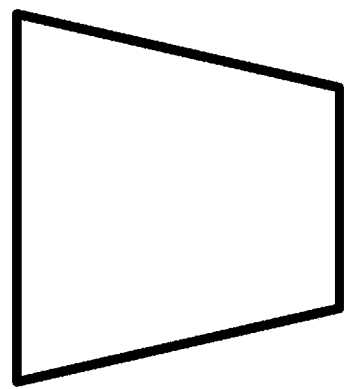
Figure 4:
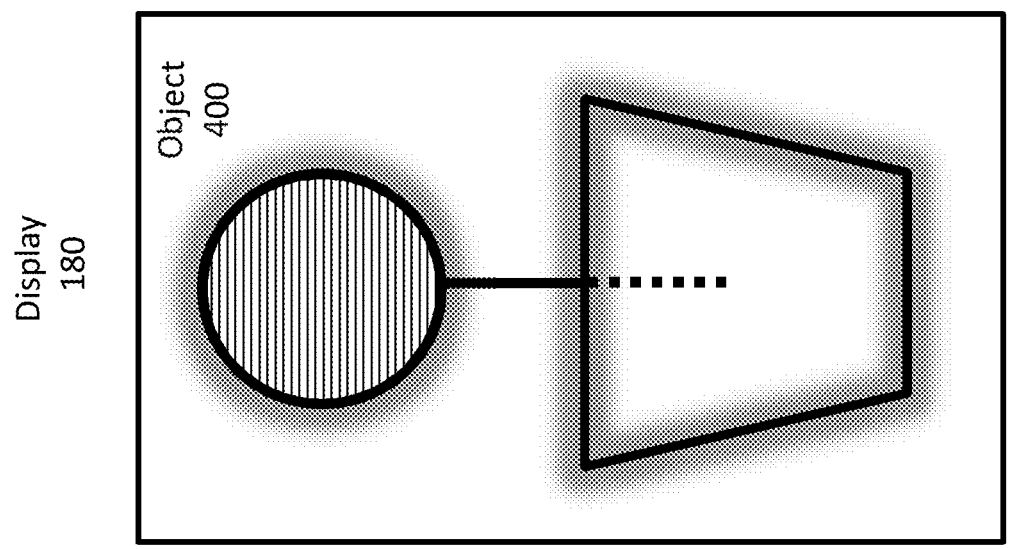
FIG. 4 depicts an object rendered on a display of the prior art client device.
Figure 5:
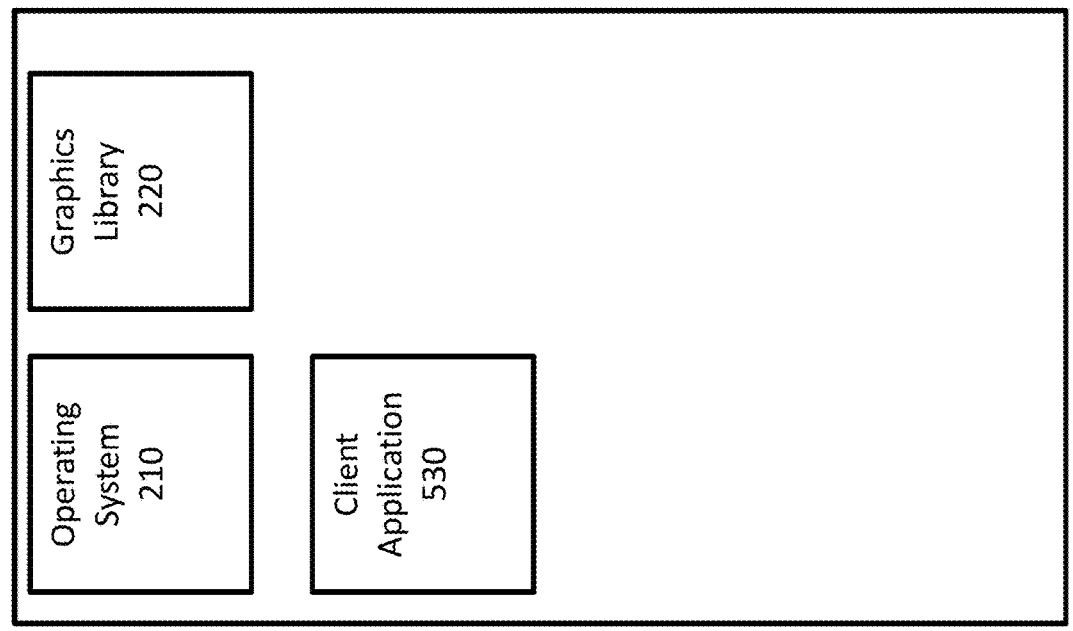
FIG. 5 depicts software components of a client device.

FIG. 5 depicts software components of client device 100 according to the embodiments of the present invention. Client device 100 comprises operating system 210, graphics library 220, and client application 530. Client application 530 comprises lines of software code executed by processing unit 110 and/or graphics processing unit 170 to perform the functions described below. For example, client device 100 can be a smartphone sold with the trademark "GALAXY" by Samsung or "IPHONE" by Apple, and client application 530 can be a downloadable app installed on the smartphone or a browser running code obtained from server 600 (described below). Client device 100 also can be a notebook computer, desktop computer, game system, or other computing device, and client application 530 can be a software application running on client device 100 or a browser on client device 100 running code obtained from server 600. Client application 530 forms an important component of the inventive aspect of the embodiments described herein, and client application 530 is not known in the prior art.

Figure 6:
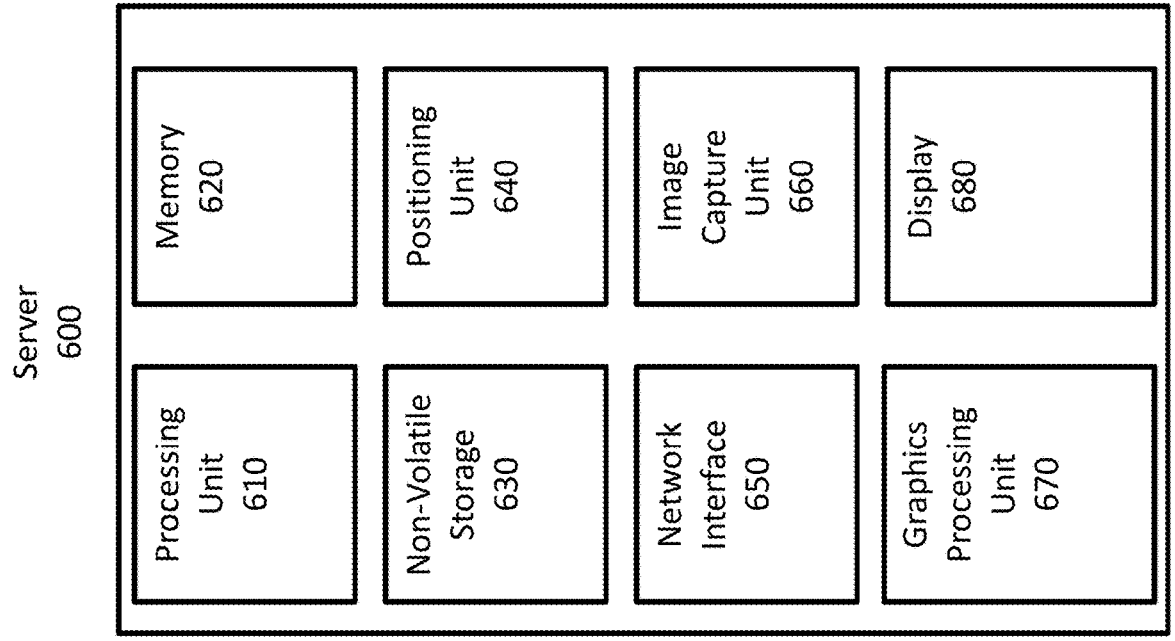
FIG. 6 depicts prior art hardware components of a server.

FIG. 6 depicts hardware components of server 600. These hardware components are known in the prior art. Server 600 is a computing device that comprises processing unit 610, memory 620, non-volatile storage 630, positioning unit 640, network interface 650, image capture unit 660, graphics processing unit 670, and display 680.

Processing unit 610 optionally comprises a microprocessor with one or more processing cores. Memory 620 optionally comprises DRAM or SRAM volatile memory. Non-volatile storage 630 optionally comprises a hard disk drive or flash memory array. Positioning unit 640 optionally comprises a GPS unit or GNSS unit that communicates with GPS or GNSS satellites to determine latitude and longitude coordinates for server 600, usually output as latitude data and longitude data. Network interface 650 optionally comprises a wired interface (e.g., Ethernet interface) or wireless interface (e.g., 3G, 4G, 5G, GSM, 802.11, protocol known by the trademark "Bluetooth," etc.). Image capture unit 660 optionally comprises one or more standard cameras (as is currently found on most smartphones and notebook computers). Graphics processing unit 670 optionally comprises a controller or processor for generating graphics for display. Display 680 displays the graphics generated by graphics processing unit 670, and optionally comprises a monitor, touchscreen, or other type of display.

Figure 7:
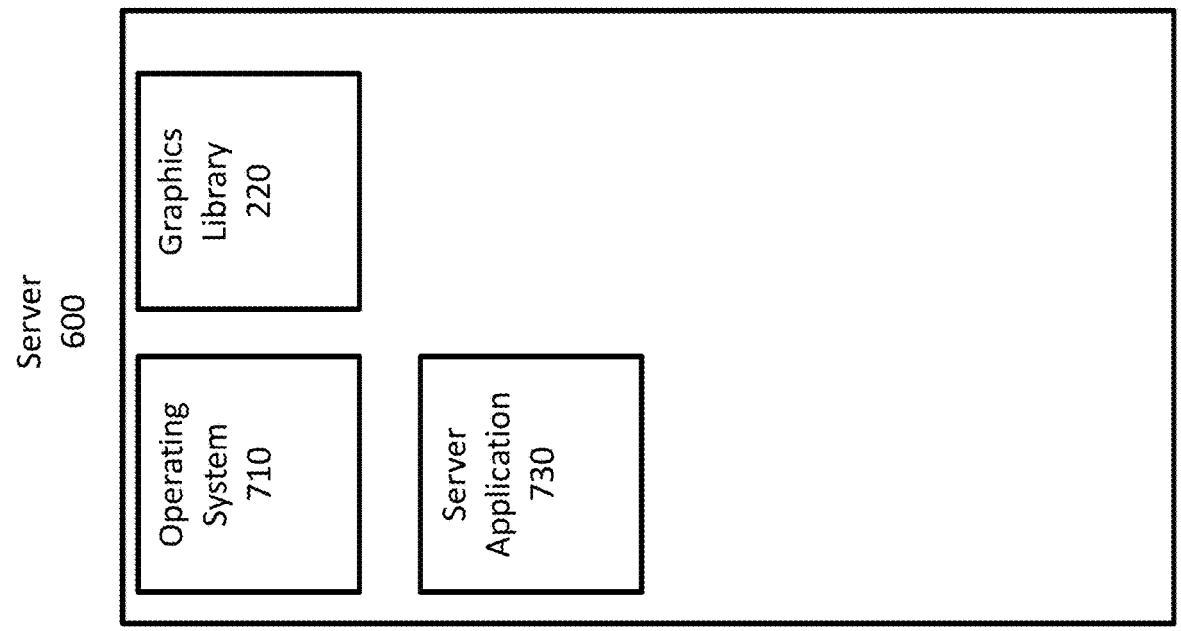
FIG. 7 depicts software components of a server.

FIG. 7 depicts software components of server 600. Server 600 comprises operating system 710 (such as the server operating systems known by the trademarks "WINDOWS SERVER," "MAC OS X SERVER," "LINUX," or others), graphics library 220, and server application 730. Server application 730 comprises lines of software code executed by processing unit 610 and/or graphics processing unit, and server application 730 is designed specifically to interact with client application 530. Server application 730 forms an important component of the inventive aspect of the embodiments described herein, and server application 730 is not known in the prior art.

Figure 8:
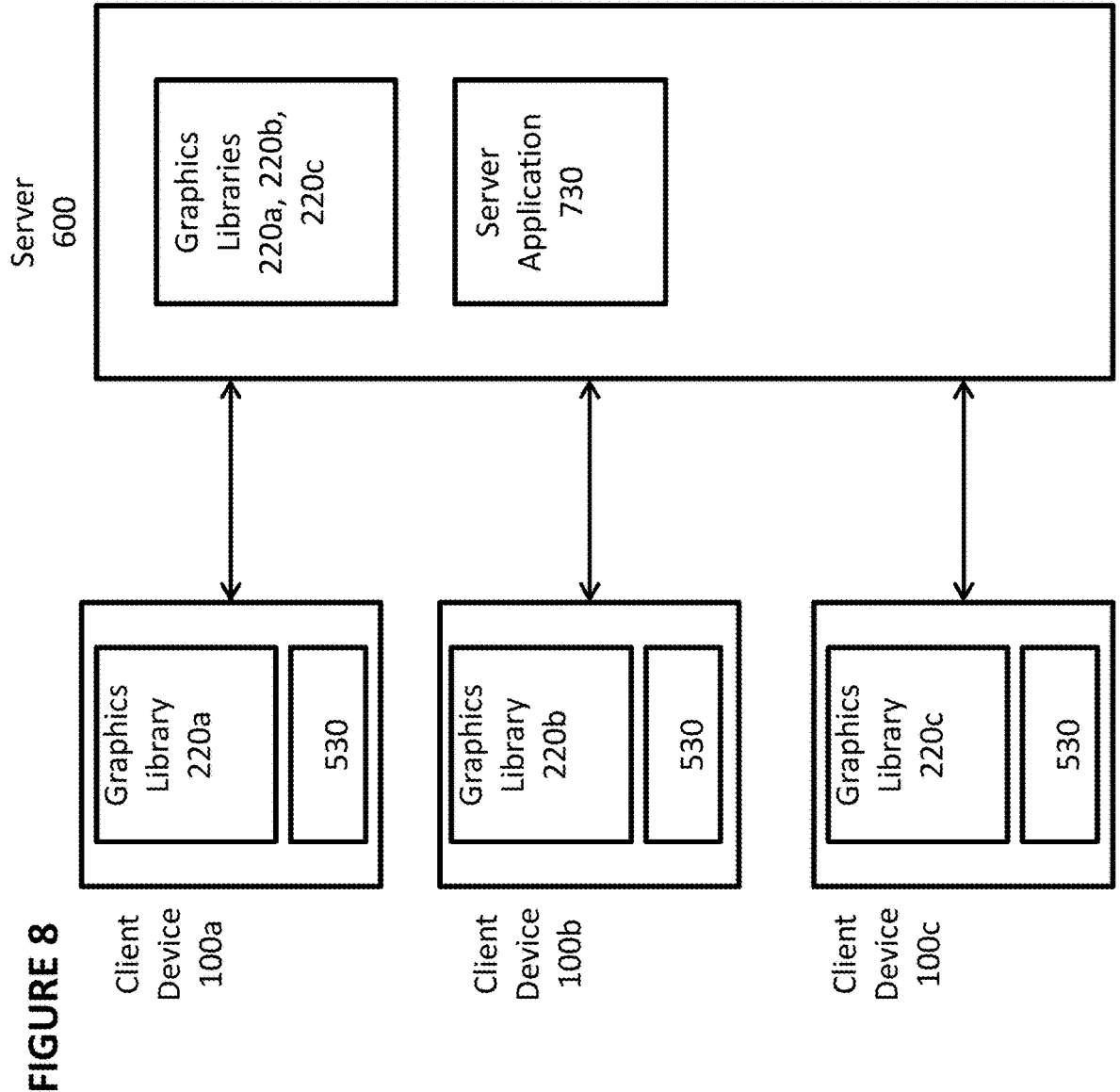
FIG. 8 depicts multiple client devices communicating with a server.

With reference to FIG. 8, three instantiations of client device 100 are shown, client devices 100a, 100b, and 100c. These are exemplary devices, and it is to be understood that any number of different instantiations of client device 100 can be used. Client devices 100a, 100b, and 100c each communicate with server 600 using network interface 150. In this example, client device 100a operates graphics library 220a, client device 100b operates graphics library 220b, and client device 100c operates graphics library 220c. Graphics libraries 220a, 220b, and 220c are different libraries that have some commonalities but some differences as well. For example, each may support a set of APIs supported by each of them, but each of them may also support other sets of APIs that are not supported by either or both of the other libraries. As an example, graphics library 220a might be OpenGL ES 2.0, graphics library 220b might be OpenGL ES 3.0, and graphics library 200c might be WebGL 1.0. Here, server 600 has access to, and is compatible with, graphics libraries 220a, 220b, 220c, and possibly others.

Figure 9:
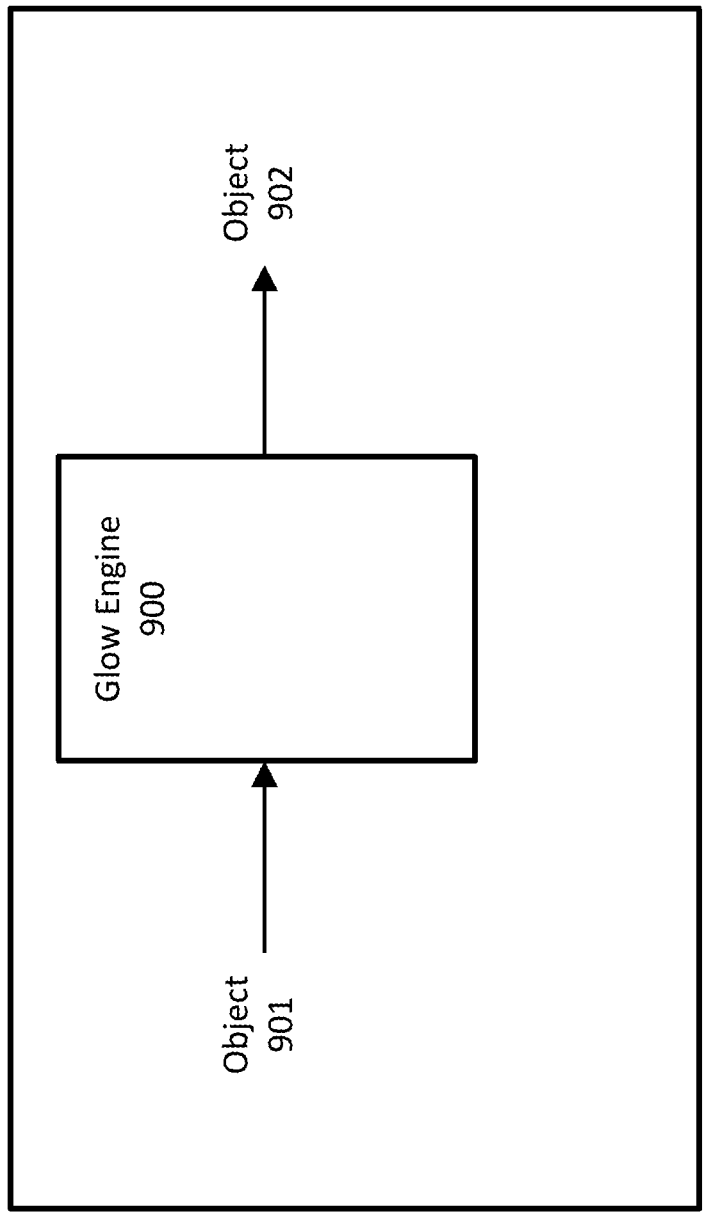
FIG. 9 depicts a glow engine.

FIG. 9 depicts glow engine 900. Glow engine 900 comprises lines of code within client application 530 or server application 730. Glow engine 900 receives object 901 as an input and generates object 902 as an output, where a glow feature is added to part or all of object 901 to generate object

902. Notably, glow engine 900 is not dependent upon any particular graphics library 220 being utilized by client device 100 or server 600.

The operation of glow engine 900 will now be described with reference to FIGS. 10 to 19. FIG. 19 depicts method 1900 for generating a glow feature in graphics object 901, and various aspects of the method are also depicted in FIGS. 10 through 18.

Figure 10:
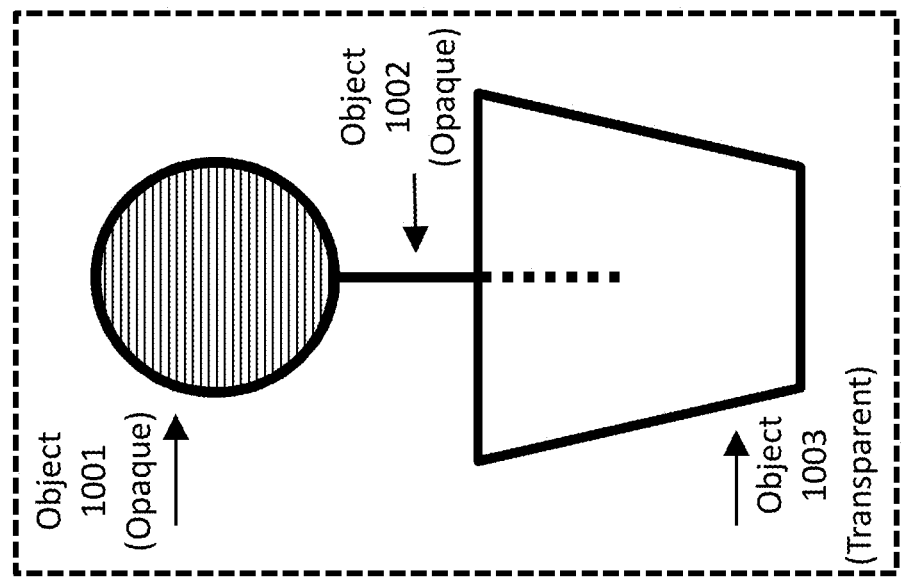
FIG. 10 depicts an object in application memory.

FIG. 10 depicts object 901, which is generated by client application 530 and comprises object 1001, object 1002, and object 1003 (step 1901 in FIG. 19). Objects 1001, 1002, and 1003 can be considered sub-objects of object 901. Object 901 is stored in application memory 1010, which is a portion of memory 120 managed by client application 530. In this example, objects 1001 and 1002 are opaque, and object 1003 is transparent. Client application 530 wishes to make objects 1001 and 1003 glow but not object 1002.

Figure 11A:
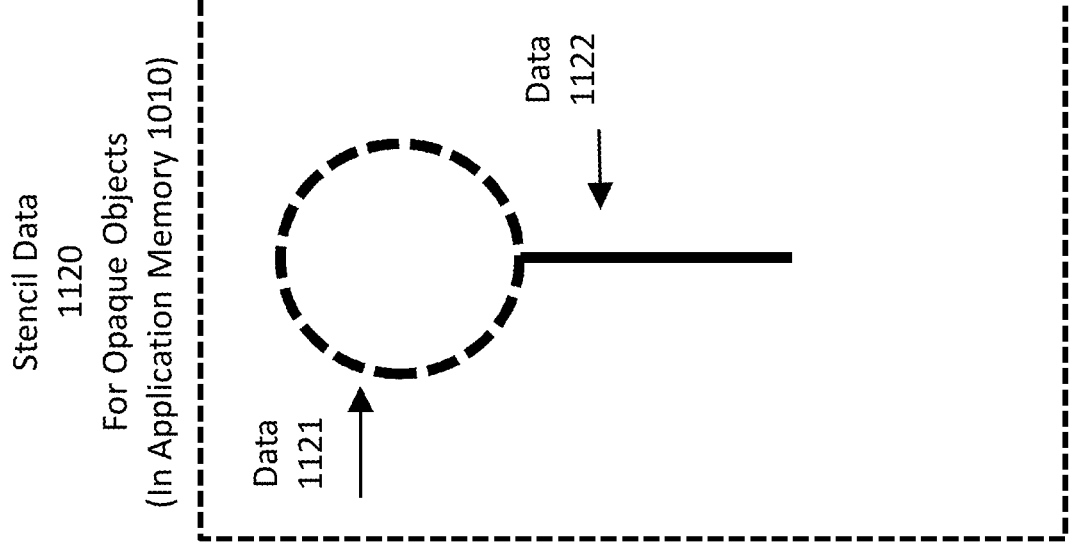
FIG. 11A depicts depth data for the object of FIG. 10.

In FIG. 11A, glow engine 900 generates depth data 1110 for all opaque objects in object 901, which here are objects 1001 and 1002 (step 1902 in FIG. 19). Specifically, depth data 1111 is generated for object 1001, and depth data 1112 is generated for object 1002. Depth data 1111 and 1112 indicate the relative depth of each opaque object and can be expressed, for example, as a layer number, where the layers will be rendered in a certain order (e.g., from lowest number layer to highest number layer). Depth data 1110 (which comprises depth data 1111 and 1112) is stored in application memory 1010.

Figure 11B:
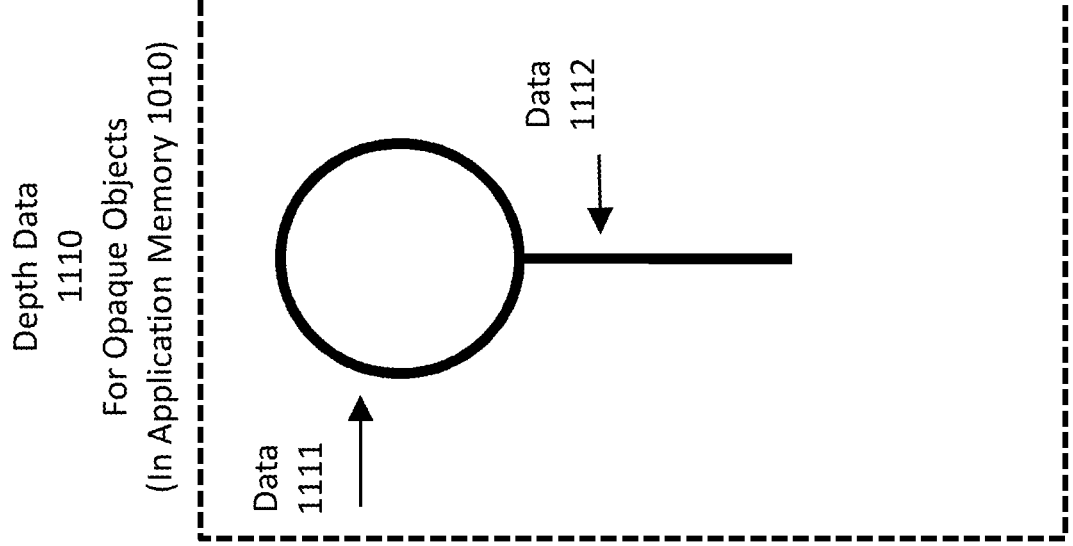
FIG. 11B depicts stencil data for the object of FIG. 10.

In FIG. 11B, glow engine 900 generates stencil data 1120 for all opaque objects, which here are objects 1001 and 1002, and marks the opaque objects that are to be glowed, which here is object 1001 (step 1902 in FIG. 19). Stencil data 1121 is generated for object 1001, and stencil data 1122 is generated for object 1002. Stencil data 1120 (which comprises stencil data 1121 and stencil data 1122) is stored in application memory 1010.

Figure 12:
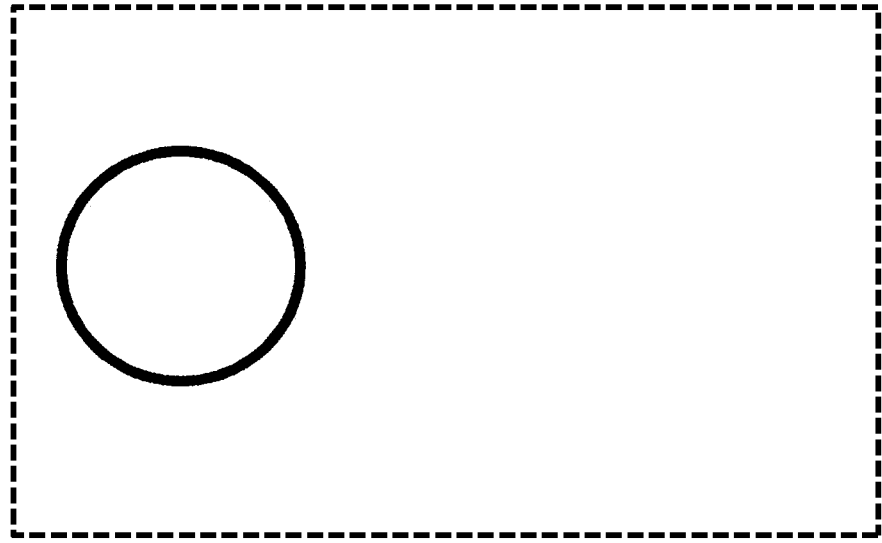
FIG. 12 depicts opaque objects within the object of FIG. 10.

In FIG. 12, glow engine 900 draws objects 1001 and 1002 into frame buffer 1201 as object 1200, based upon stencil data 1120, which essentially draws all opaque objects (step 1903 in FIG. 19). Here, stencil data 1120 acts as a mask that determines which objects become part of object 1200.

Figure 13:
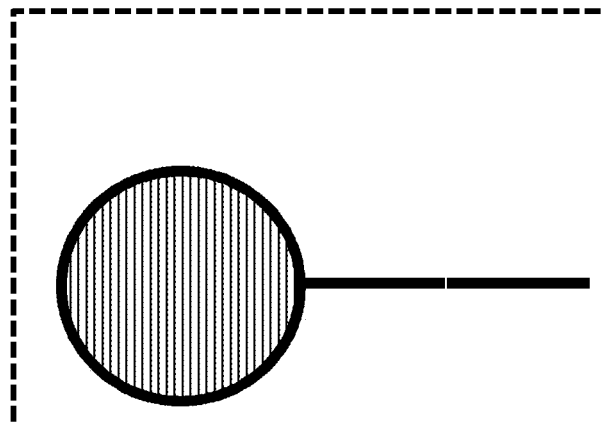
FIG. 13 depicts an object to which the glow feature is to be implemented.

In FIG. 13, glow engine 900 draws the portion of object 901 that is marked by stencil data 1120 into frame buffer 1202, which here yields only object 1001, which is the opaque object upon which the glow is to be added (step 1904 in FIG. 19).

Figure 14:
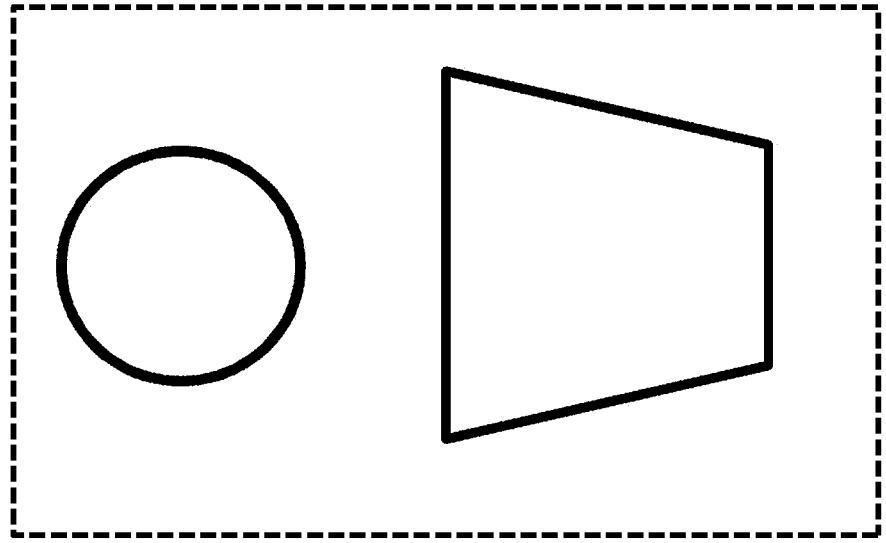
FIG. 14 depicts opaque objects and transparent objects.

In FIG. 14, glow engine 900 draws object 1400 comprising transparent objects and object 1200 into frame buffer 1203 (step 1905 in FIG. 19).

Figure 15:
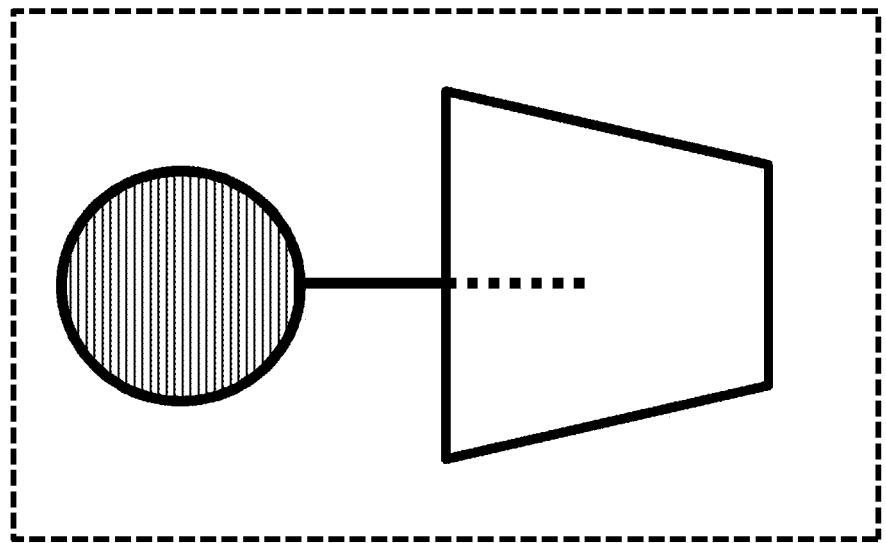
FIG. 15 depicts an object to which the glow feature is to be implemented.

In FIG. 15, glow engine 900 draws object 1500 to which the glow is to be added (step 1906 in FIG. 19), which includes opaque object 1001 and transparent object 1003.

Figure 16:
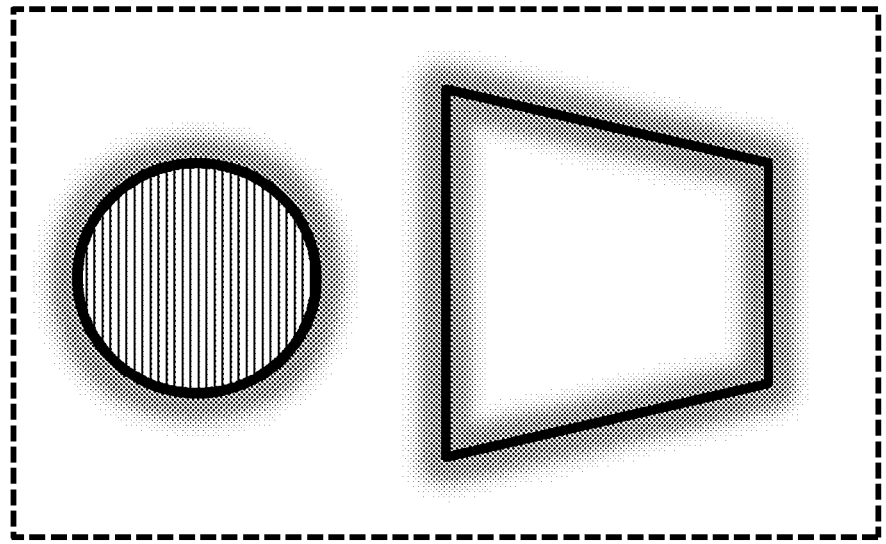
FIG. 16 depicts an object to which the glow feature has been implemented

In FIG. 16, glow engine 900 performs a BLUR function on object 1500 to generate blurred object 1600, which it places into frame buffer 1205 (step 1907 in FIG. 19).

Figure 17:
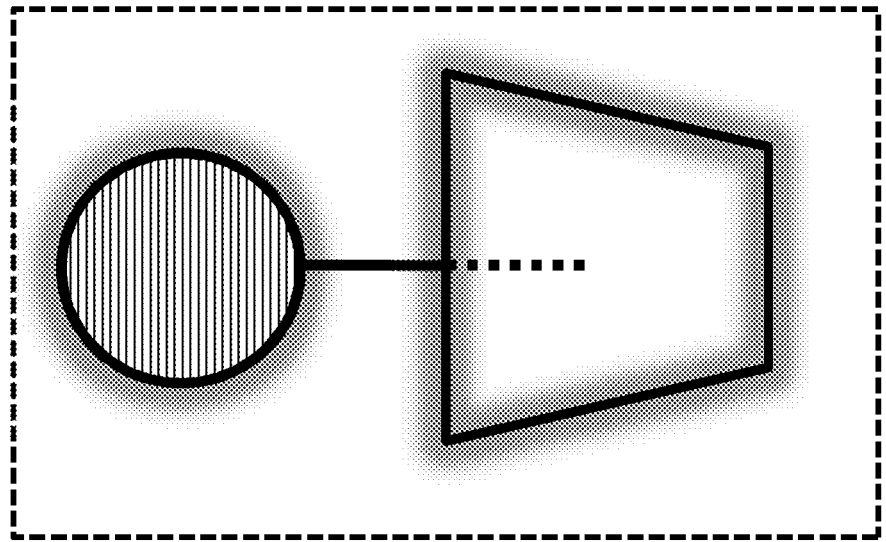
FIG. 17 depicts an object with the glow feature implemented on part of it.

In FIG. 17, glow engine 900 combines object 1600 with object 1400 to yield object 902 in frame buffer 1206 (step 1908 in FIG. 19). With reference again to FIG. 9, it can be seen that glow engine 900 has now generated object 902, which is a blurred version of object 901, where objects 1001 and 1003 have been blurred but object 1002 has not been blurred.

Figure 18:
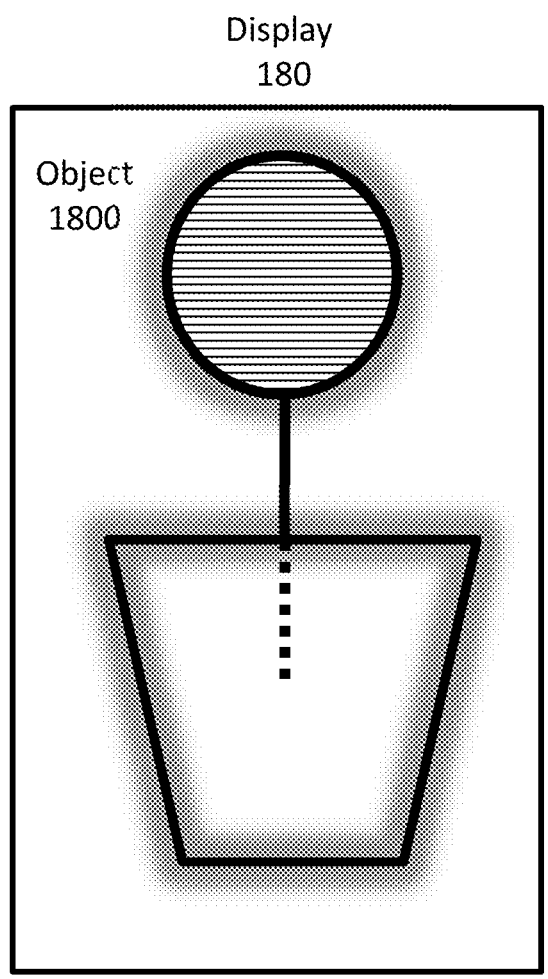
FIG. 18 depicts an object rendered on a display.

In FIG. 18, object 1800 (which is the rendered version of object 902) is then rendered on display 180 of client device 100 (step 1909 in FIG. 19).

Notably, method 1900 and the related apparatus described above for FIGS. 10-19 do not require writing to more than one frame buffer at a time. As a result, method 1900 and the related apparatus can be implemented on a wide variety of computing devices utilizing a wide variety of graphics libraries. The end result is that a glow feature can be applied to part or all of an object across many different platforms, including systems running versions of OpenGL ES that predate version 3.0.

References to the present invention herein are not intended to limit the scope of any claim or claim term, but instead merely make reference to one or more features that may be covered by one or more of the claims. Materials, processes and numerical examples described above are exemplary only, and should not be deemed to limit the claims. It should be noted that, as used herein, the terms "over" and "on" both inclusively include "directly on" (no intermediate materials, elements or space disposed there between) and "indirectly on" (intermediate materials, elements or space disposed there between). Likewise, the term "adjacent" includes "directly adjacent" (no intermediate materials, elements or space disposed there between) and "indirectly adjacent" (intermediate materials, elements or space disposed there between). For example, forming an element "over a substrate" can include forming the element directly on the substrate with no intermediate materials/elements there between, as well as forming the element indirectly on the substrate with one or more intermediate materials/elements there between.

What is claimed is:

1. A method of generating a glow effect on an object, the method performed by a computing device and comprising:
    generating an object in application memory, the object comprising one or more opaque sub-objects and one or more transparent sub-objects, wherein one or more of the opaque sub-objects and transparent sub-objects are identified as sub-objects to be glowed;
    generating depth data and stencil data for the one or more opaque sub-objects;
    drawing the one or more opaque sub-objects based upon the stencil data into a first frame buffer;
    drawing the one or more transparent sub-objects and the contents of the first frame buffer in a second frame buffer;
    drawing the one or more opaque sub-objects to be glowed into a third frame buffer;
    drawing the one or more transparent sub-objects to be glowed into the third frame buffer;
    blurring the sub-objects to be glowed in the third frame buffer to generate blurred objects;
    storing the blurred objects in a fourth frame buffer;
    adding the contents of the fourth frame buffer and the contents of the second frame buffer to generate a final object; and
    rendering the final object on a display.

2. The method of claim 1, wherein the computing device is a client device.

3. The method of claim 2, wherein the client device is a notebook computer.

4. The method of claim 2, wherein the client device is a smartphone.

5. The method of claim 1, wherein the computing device is a server.

6. The method of claim 1, wherein the computing device utilizes a graphics library.

7. The method of claim 6, wherein the graphics library is OpenGL ES 3.0.

8. The method of claim 6, wherein the graphics library is OpenGL ES 2.0.

9. A computing device for generating a glow effect on an object, the computing device comprising:
- a memory comprising application memory; and
- a processing unit for executing software instructions for performing the following steps:
  - generating an object in application memory, the object comprising one or more opaque sub-objects and one or more transparent sub-objects, wherein one or more of the opaque sub-objects and transparent sub-objects are identified as sub-objects to be glowed;
  - generating depth data and stencil data for the one or more opaque sub-objects;
  - drawing the one or more opaque sub-objects based upon the stencil data into a first frame buffer;
  - drawing the one or more transparent sub-objects and the contents of the first frame buffer in a second frame buffer;
  - drawing the one or more opaque sub-objects to be glowed into a third frame buffer;
  - drawing the one or more transparent sub-objects to be glowed into the third frame buffer;
  - blurring the sub-objects to be glowed in the third frame buffer to generate blurred objects;
  - storing the blurred objects in a fourth frame buffer;
  - adding the contents of the fourth frame buffer and the contents of the second frame buffer to generate a final object; and
  - rendering the final object on a display.

10. The computing device of claim 9, wherein the computing device is a client device.

11. The computing device of claim 10, wherein the client device is a notebook computer.

12. The computing device of claim 10, wherein the client device is a smartphone.

13. The computing device of claim 9, wherein the computing device is a server.

14. The computing device of claim 9, wherein the software instructions utilize a graphics library.

15. The computing device of claim 14, wherein the graphics library is OpenGL ES 3.0.

16. The computing device of claim 14, wherein the graphics library is OpenGL ES 2.0.

* * * * *